(12) United States Patent
Xue et al.

(10) Patent No.: US 9,286,918 B1
(45) Date of Patent: Mar. 15, 2016

(54) WRITE HEAD WITH COIL STRUCTURE ALIGNED WITH YOKE

(71) Applicant: Seagate Technology LLC, Cupertino, CA (US)

(72) Inventors: Jianhua Xue, Maple Grove, MN (US);
Jiaoming Qiu, Maple Grove, MN (US);
Kirill Rivkin, Edina, MN (US);
Huaqing Yin, Eden Prairie, MN (US);
John Wolf, Maple Grove, MN (US);
Yonghua Chen, Bloomington, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/798,998

(22) Filed: Jul. 14, 2015

Related U.S. Application Data

(63) Continuation of application No. 14/471,959, filed on Aug. 28, 2014, now Pat. No. 9,082,428.

(51) Int. Cl.
*G11B 5/17* (2006.01)
*G11B 5/31* (2006.01)

(52) U.S. Cl.
CPC . *G11B 5/17* (2013.01); *G11B 5/313* (2013.01)

(58) Field of Classification Search
CPC .. G11B 5/1278; G11B 5/3116; G11B 5/3123; G11B 5/315; G11B 5/17
USPC ............................ 360/123.03, 125.04, 125.06
See application file for complete search history.

(56) References Cited

U.S. PATENT DOCUMENTS

| | | | |
|---|---|---|---|
| 3,891,995 A | 6/1975 | Hanazono et al. |
| 4,631,612 A | 12/1986 | Shiiki et al. |
| 4,652,957 A | 3/1987 | Schewe et al. |
| 4,675,766 A | 6/1987 | Schewe |
| 4,703,382 A | 10/1987 | Schewe et al. |
| 6,038,106 A | 3/2000 | Aboaf et al. |
| 6,195,233 B1 | 2/2001 | Akiyama et al. |
| 6,798,615 B1 | 9/2004 | Litinov et al. |
| 6,954,331 B2 | 10/2005 | Crawford et al. |
| 6,984,333 B2 | 1/2006 | Matono et al. |
| 7,394,621 B2 | 6/2008 | Li et al. |
| 7,515,381 B2 | 4/2009 | Baer et al. |
| 7,535,674 B2 | 5/2009 | Lee et al. |
| 7,567,409 B2 | 7/2009 | Lee et al. |
| 7,656,612 B2 | 2/2010 | Sasaki et al. |
| 7,672,079 B2 | 3/2010 | Li et al. |
| 7,679,862 B2 | 3/2010 | Nakamoto et al. |
| 8,004,792 B2 | 8/2011 | Biskeborn et al. |
| 8,035,922 B2 | 10/2011 | Lille et al. |
| 8,054,580 B2 | 11/2011 | Kimura et al. |
| 8,125,732 B2 | 2/2012 | Bai et al. |
| 8,179,636 B1 | 5/2012 | Bai et al. |

(Continued)

FOREIGN PATENT DOCUMENTS

| | | |
|---|---|---|
| JP | 62165718 A | 1/1989 |
| JP | 2130710 | 5/1990 |
| JP | 2628854 B2 | 7/1997 |

*Primary Examiner* — Will J Klimowicz
(74) *Attorney, Agent, or Firm* — HolzerIPLaw, PC (57) ABSTRACT

A write head having a main pole having a pole tip proximate an air bearing surface (ABS), the main pole having a leading side and a trailing side. The write head also includes a yoke having a yoke tip recessed from the ABS, and a helical coil wrapped around the main pole and the yoke. The helical coil has a first turn with its front edge at least substantially aligned with the yoke tip.

9 Claims, 7 Drawing Sheets

(56) References Cited

U.S. PATENT DOCUMENTS

| | | |
|---|---|---|
| 8,218,263 B2 | 7/2012 | Allen et al. |
| 8,264,792 B2 | 9/2012 | Bai et al. |
| 8,339,736 B2 | 12/2012 | Gao et al. |
| 8,345,384 B1 | 1/2013 | Sasaki et al. |
| 8,390,962 B2 | 3/2013 | Gunder et al. |
| 8,405,930 B1 | 3/2013 | Li et al. |
| 8,416,528 B1 | 4/2013 | Sasaki et al. |
| 8,472,135 B1 | 6/2013 | Kusukawa et al. |
| 8,472,146 B2 | 6/2013 | Brown et al. |
| 8,537,494 B1 | 9/2013 | Pan et al. |
| 8,547,659 B1 | 10/2013 | Bai et al. |
| 8,582,236 B2 | 11/2013 | Linville et al. |
| 8,605,386 B1 | 12/2013 | Ohtake et al. |
| 8,649,125 B1 | 2/2014 | Basu et al. |
| 8,665,561 B1 | 3/2014 | Knutson et al. |
| 8,687,318 B2 | 4/2014 | Meloche et al. |
| 8,749,919 B2 | 6/2014 | Sasaki et al. |
| 8,786,983 B1 | 7/2014 | Liu et al. |
| 8,804,280 B2 | 8/2014 | Lopusnik et al. |
| 8,817,418 B1 | 8/2014 | Matsuo et al. |
| 8,842,387 B1 | 9/2014 | Horide et al. |
| 8,879,208 B1 | 11/2014 | Liu et al. |
| 8,917,480 B2 | 12/2014 | Liu et al. |
| 9,082,428 B1 * | 7/2015 | Xue .................. G11B 5/17 |
| 2002/0071208 A1 | 6/2002 | Batra et al. |
| 2002/0135943 A1 | 9/2002 | Nishizawa et al. |
| 2004/0047079 A1 | 3/2004 | Ito et al. |
| 2004/0169958 A1 | 9/2004 | Krounbi et al. |
| 2006/0002021 A1 | 1/2006 | Li et al. |
| 2007/0159719 A1 * | 7/2007 | Yamakawa ....... G11B 5/3116 360/125.03 |
| 2008/0231994 A1 | 9/2008 | Kimura et al. |
| 2008/0316631 A1 | 12/2008 | Gao et al. |
| 2008/0316643 A1 | 12/2008 | Linville et al. |
| 2009/0116144 A1 * | 5/2009 | Lee ................ G11B 5/1278 360/125.01 |
| 2010/0157471 A1 * | 6/2010 | Allen ............. G11B 5/1278 360/123.01 |
| 2010/0187120 A1 | 7/2010 | Seets et al. |
| 2012/0050915 A1 | 3/2012 | Hong et al. |
| 2012/0147503 A1 | 6/2012 | Zou et al. |
| 2012/0170154 A1 | 7/2012 | Sasaki et al. |
| 2013/0003226 A1 | 1/2013 | Bai et al. |
| 2013/0242432 A1 | 9/2013 | Meloche et al. |
| 2014/0307348 A1 | 10/2014 | Min et al. |
| 2014/0313614 A1 | 10/2014 | Hsiao et al. |

* cited by examiner

WRITE HEAD WITH COIL STRUCTURE ALIGNED WITH YOKE

CROSS REFERENCE

This application is a continuation of U.S. application Ser. No. 14/471,959 filed Aug. 28, 2014, now U.S. Pat. No. 9,082,428, the entire disclosures of which are incorporated herein by reference for all purposes.

BACKGROUND

A disc drive is an example of a data storage system that uses magnetic fields for writing and reading data. Transducers write information to and read information from data surfaces of the discs. In one example, transducers include a recording or write head for generating a magnetic field that aligns the magnetic moments of a magnetic medium to represent desired bits of data. Magnetic recording heads include both longitudinal and perpendicular recording techniques. Perpendicular recording is a form of magnetic recording in which magnetic moments representing bits of data are oriented perpendicularly to the surface of the recording layer. Perpendicular magnetic write heads typically include main and return poles that are separated to form a write gap and extend from pole tips located at an air-bearing surface (ABS) to a back gap region. A coil is included to generate magnetic signals through the main and return poles in response to a current conducted through the coil. The main pole tip focuses the magnetic flux density such that the magnetic fields interact with the magnetic medium to orient its magnetic moments in an up or down direction.

As the desire for higher data rate and higher data density increases in magnetic memory storage, great challenges are placed on magnetic write head design.

SUMMARY

Implementations described and claimed herein provide a write head comprising a write pole, a yoke, and a coil structure helically wound around the write pole and the yoke, the coil structure having the first turn of the coil structure aligned with the tip of the yoke.

One particular implementation is a write head having a main pole, a trailing yoke having a yoke tip; and a coil structure around the main pole and the yoke. The coil structure has a first turn with its front edge at least substantially aligned with the yoke tip.

Another particular implementation is write head having a main pole having a pole tip proximate an air bearing surface (ABS), with the main pole having a leading side and a trailing side. The write head also includes a leading yoke having a leading yoke tip recessed from the ABS and a trailing yoke having a trailing yoke tip recessed from the ABS. A coil structure is present around the main pole and the yokes. The coil structure has a first turn on the leading side with its front edge at least substantially aligned with the leading yoke tip, and also has a first turn on the trailing side with its front edge at least substantially aligned with the trailing yoke tip.

Yet another particular implementation is a disc drive comprising at least one magnetic storage disc, and a transducer head comprising a read head and a write head. The write head has a main pole, a trailing yoke having a yoke tip, and a coil structure around the main pole and the yoke, the coil structure having a first turn with its front edge at least substantially aligned with the yoke tip.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

DETAILED DESCRIPTION

As indicated above, the desire for higher data rate and higher areal density results in great challenges in designing the magnetic write head. In perpendicular recording, the write head 'writes' information into the recording media by switching the writer's magnetic field from one polarity to the other through a driving current waveform change. When recording at high data rate (HDR), the switching speed increases. Normally, the write field magnitude will be degraded and magnitude variation will be enlarged with data rate increase. These not only cause poorer media saturation, but also cause worse transition sharpness between bits. In addition, since write field bubble expansion is slower at the track edge than in the track center, the transition curvature along the cross-track direction will become larger as the data rate increases. All these HDR effects cause a poorer signal-to-noise ratio (SNR) for the recording information. The basic requirements for writer design for high areal density recording (e.g., high linear density and high track density) include providing strong writeability, confining the field in the down-track and cross-track directions, and reducing the erase field. In the push to increase track density, reducing the trailing edge physical width of the write pole tip directly helps reduce track pitch. However, with a write field of the same magnitude, reducing write pole width could cause larger track inflation and increase of the adjacent track fringing field. The large adjacent track fringing field will degrade the write field cross-track gradient and worsen the track edge erase band. This in turn will limit the track density push. Confining the field in the cross-track direction by including a side shield in the writer, for example, will improve cross-track field gradient and reduce the erase band. Thus, the track density may see a big improvement. However, a reliability issue is during transition writing; magnetization's dynamic activity in a side shield will cause a side track erasure field that will ruin the recording information in side tracks.

The present disclosure provides writer designs, or write head designs, that can significantly increase the write speed (e.g., faster switching) and improve driving current-write field efficiency, thus benefiting HDR performance. The write designs have a shorter magnetic field rise time while decreasing the coil power needed to achieve the magnetic field. The lower coil power will correspond to lower erasure field, benefiting writer's reliability An implementation of a recording head disclosed herein includes a coil structure having its first turn at least substantially aligned with the end or tip of the trailing side or top yoke. The alignment of the coil structure with the yoke tip increases the switching speed of the write head and decreases the power usage, both which improve high data rate performance. In some implementations, the difference in distance between the coil to the ABS and the yoke tip to the ABS is no more than 10 nm. In other implementations, the difference in distance between the coil to the ABS and the yoke tip to the ABS is no more than 20 nm, or 50 nm. In some implementations, a difference in distance between the coil to the ABS and the yoke tip and the ABS is no more than 100 nm. In some implementations, the offset or difference in distance is no more than 20% of the diameter of the wind or turn of the coil. In other implementations, the offset or difference in distance is no more than 10% or even no more than 5% of the distance between the coil to the ABS, and in yet other implementations the offset or difference in distance is no more than 10% or even no more than 5% of the distance between the yoke tip to the ABS.

In the following description, reference is made to the accompanying drawing that forms a part hereof and in which are shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

In some instances, a reference numeral may have an associated sub-label consisting of a lower-case letter to denote one of multiple similar components. When reference is made to a reference numeral without specification of a sub-label, the reference is intended to refer to all such multiple similar components.

Figure 1:
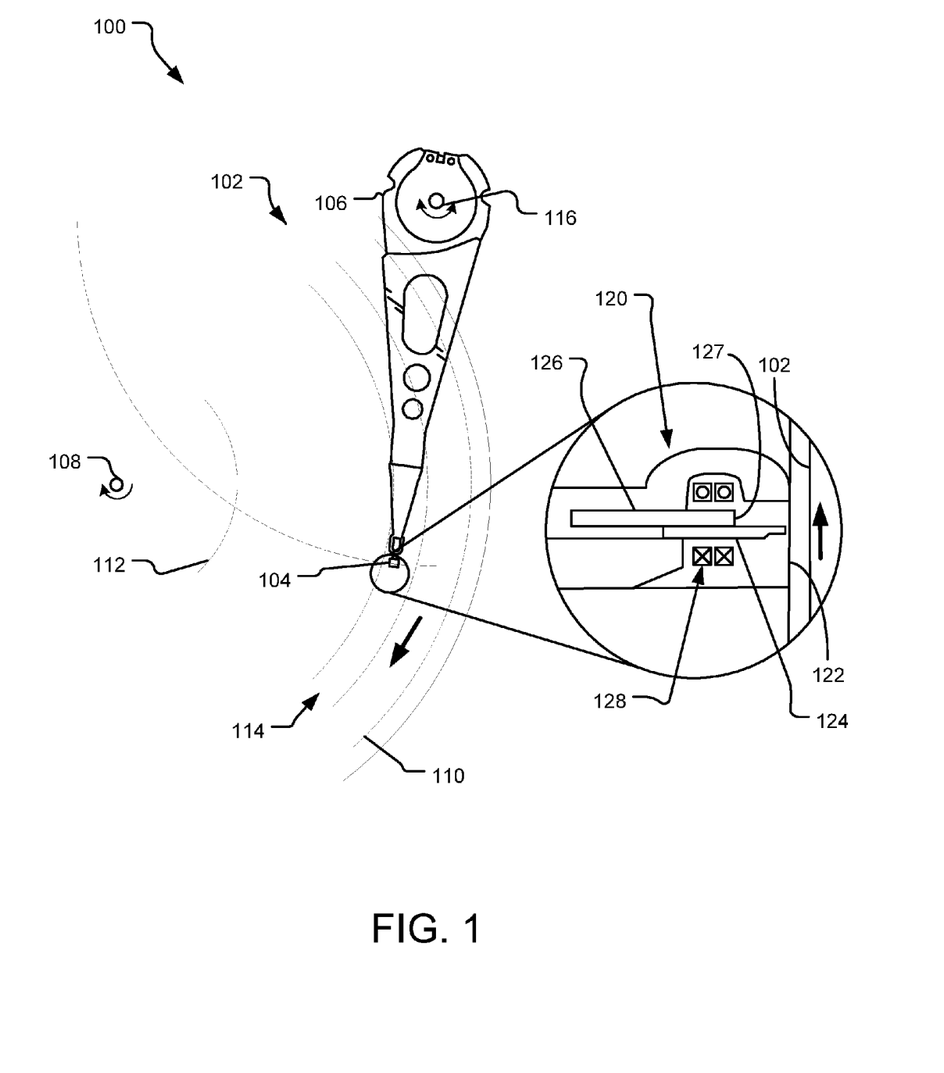
FIG. 1 is a schematic top view of storage device having an example write head implemented on an end of an actuator assembly.

FIG. 1 illustrates a storage device 100 having an example recording head structure implemented on an end of an actuator assembly. Specifically, FIG. 1 illustrates a top plan view of an implementation of a magnetic media or disc 102 with a transducer head 104 situated on an end of an actuator assembly 106. Disc 102 rotates about a disc axis of rotation 108 during operation in the direction indicated. Further, disc 102 includes an outer diameter 110 and inner diameter 112 between which are a number of data tracks 114, illustrated by dotted lines. Data tracks 114 are substantially circular and are made up of regularly spaced patterned bits.

Information may be written to and read from the patterned bits on data tracks 114 through the use of actuator assembly 106, which rotates during a data track 114 seek operation about an actuator axis of rotation 116. Transducer head 104, mounted on actuator assembly 106 at an end distal from the actuator axis of rotation 116, flies in close proximity above the surface of disc 102 during disc operation. Transducer head 104 includes a recording head including a read pole for reading data from track 114 and a write pole for writing data to track 114.

FIG. 1 also illustrates an expanded view of a partial cross-sectional configuration of transducer head 104, particularly, of a write head portion 120 of transducer head 104. Write head 120 is illustrated with its air bearing surface (ABS) 122 near magnetic media or disc 102. The direction of rotation of disc 102 is indicated in the expanded view.

Specifically, write head 120 includes a main pole 124 (also referred to as the write pole) configured to write data to disc 102 by a magnetic field. Main pole 124 is made of a ferromagnetic material such as, but not limited to, iron (Fe), cobalt (Co), nickel (Ni), and combinations thereof. For example, main pole 124 can comprise an alloy such as, but not limited to, iron and cobalt (FeCo), iron and nickel (FeNi), cobalt, iron and nickel (CoFeNi), iron and aluminum nitride (FeAlN), iron and tantalum nitride (FeTaN), cobalt, iron and boron (CoFeB), cobalt and iron nitride (CoFeN), and the like.

Write head 120 also includes a yoke 126, which facilitates switching of the magnetic flux from main pole 124. A yoke tip 127 is recessed from the ABS 122 and from the tip of main pole 124. Yoke 126 and its yoke tip 127 are made of a high magnetic moment material, such as iron cobalt (FeCo), cobalt iron nickel (CoFeNi), and the like.

Write head 120 is energized using a coil structure 128 present around main pole 124 and yoke 126 with a plurality of turns. Coil structure 128 may be a helical coil wrapped around main pole 124 and yoke 126, or coil structure 128 may be composed of planar coils present on each side of main pole 124 and yoke 126. Coil structure 128 is made of an electrically conductive material such as, but not limited to, copper (Cu), silver (Ag), gold (Au), and combinations thereof. Coil structure 128 generates a magnetic field to rotate the magnetization in yoke 126 and main pole 124 from behind ABS 122; the rotation or switching happens when a magnetic domain wall propagates to the ABS 122.

Coil structure 128 is positioned so that it is at least substantially aligned with yoke tip 127. In other words, yoke tip 127 and the front edge of coil structure 128 are substantially the same distance from the ABS 122. In some implementations, the difference in distance between coil structure 128 to the ABS 122 and yoke tip 127 and the ABS 122 is no more than 10 nm. In other implementations, the difference in distance between coil structure 128 to the ABS 122 and yoke tip 127 and the ABS 122 is no more than 20 nm, or 50 nm. In some implementations, a difference in distance between coil structure 128 to the ABS 122 and yoke tip 127 and the ABS 122 is no more than 100 nm. In some implementations, the offset or difference in distance is no more than 20% of the diameter of the wind of coil structure 128. In other implementations, the offset or difference in distance is no more than 10% or even no more than 5% of the distance between coil structure 128 to the ABS 122, and in yet other implementations the offset or difference in distance is no more than 10% or even no more than 5% of the distance between yoke tip 127 to the ABS 122. Example distances from ABS 122 to yoke tip 127 and/coil structure 128 include distances between 1 and 2 micrometers, such as 1.2 micrometers, 1.3 micrometers, 1.5 micrometers, and 1.8 micrometers.

Such a write head design, having the first coil turn of the coil structure at least substantially aligned with the yoke tip, improves the efficiency of the coil structure by positioning the yoke(s) so that it receives optimum magnetic flux from the active turns, thus improving high data rate performance and efficiency. The configuration provides an efficient writer, reducing both magnetic rise time (i.e., the time to fully reverse saturate a pole) and amplitude of current needed to saturate the pole tip, as well as reducing erasure flux. As described above, a magnetic flux in the pole propagates to the ABS 122 from coil structure 128 and main pole 124. The longer the travelling distance for the magnetic flux, the slower the switching of the magnetic orientation. Thus, moving the coil closer to the ABS 122 reduces the travelling distance and the magnetization complexity, so that switching speed is increased. The configuration also requires less writing power, thus providing overall electrical and thermal-mechanical improvements. Additional implementations of write heads having the first coil turn at least substantially aligned with the yoke tip are described below.

Figure 2:
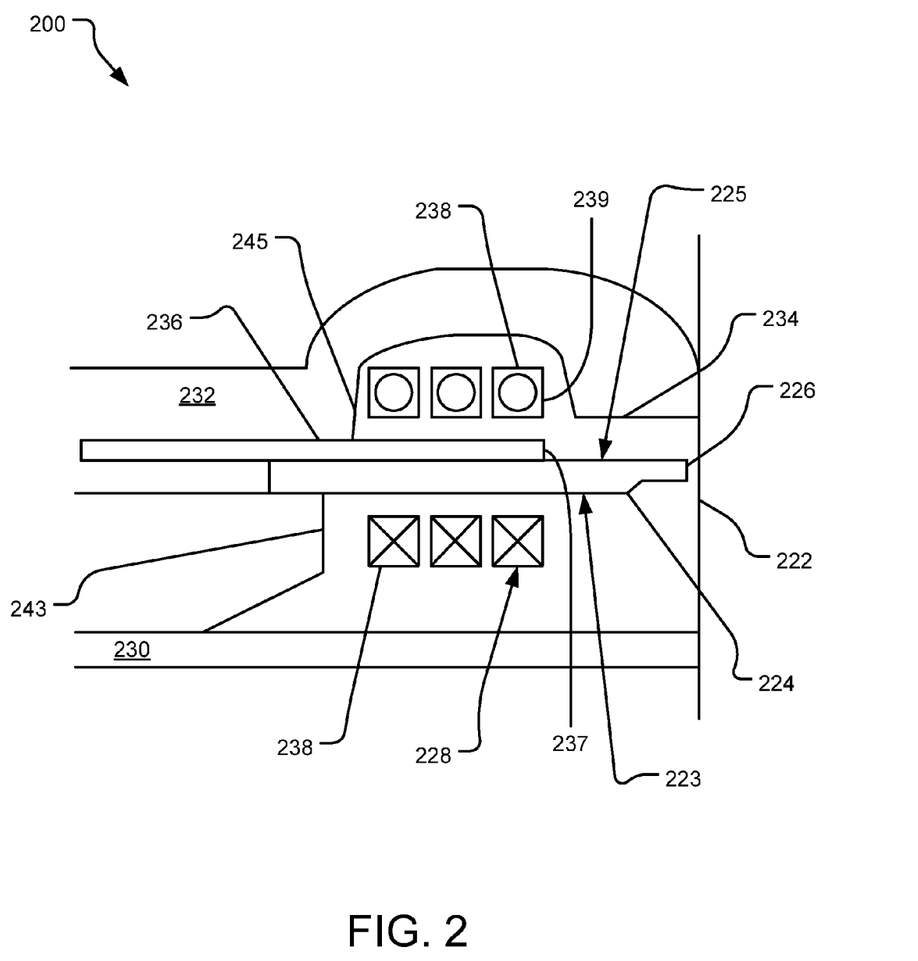
FIG. 2 is a schematic cross-sectional partial side view of an example write head.

FIG. 2 illustrates a write head 200 having an air bearing surface (ABS) 222, a main pole 224 (also referred to as the write pole) defining a leading edge side 223 and a trailing edge side 225; leading edge side 223 engages the disc prior to main pole 224 engaging the disc as it spins, and trailing edge side 225 engages the disc after main pole 124 engages the disc as it spins. Main pole 224 has a pole tip 226 proximate the ABS 222. On trailing edge side 225 of main pole 224 is a yoke 236 having a yoke tip 237 recessed from pole tip 226. A coil structure 228 is present around main pole 224 and yoke 236 as a plurality of turns 238.

Write head 200 has a first return pole (RP1) 230 on leading edge side 223 of pole 224 and a second return pole (RP2) 232 on trailing edge side 225 of pole 224. RP2 232 includes a front shield 234 extending towards main pole 224 at the ABS 222; front shield 234 may be integral with RP2 232 or may be a separate element, either or the same or different material than RP2 232. A first back via 243 connects main pole 224 to RP1 230 by way of yoke 236 and a second back via 245 connects main pole 224 to RP2 232.

Coil structure 228 extends between main pole 224 and RP1 230 and between main pole 224/yoke 236 and RP2 232. Coil structure 228 may be a helical coil wrapped around main pole 224 and yoke 236, or coil structure 228 may be composed of planar coils present on leading edge side 223 of main pole 224 and on trailing edge side 225 of yoke 236. In this implementation, coil structure 228 has three turns 238 on each side of main pole 224 and yoke 236. Each turn 238 of coil structure 228 is connected in series with the other turns 238 of coil structure 228, at least on that side of main pole 224. However, any suitable configuration of coil structure 228 can be utilized; for example, coil structure 228 can comprise a plurality of coils (e.g., three coils) each forming separate electric circuits. In one implementation, a dielectric or insulating material (not shown), such as alumina (Al$_2$O$_3$), electrically insulates coil structure 228 from main pole 224 and RP1 230 and from main pole 224/yoke 236 and RP2 232.

A front edge 239 of first turn 238 of coil structure 228 (i.e., the turn closest to the ABS 222) is at least substantially aligned with yoke tip 237; that is, the distance from edge 239 of first turn 238 to the ABS 222 is at least substantially the same as the distance from yoke tip 237 to the ABS 222. In some implementations, the difference in distance between edge 239 of first turn 238 to the ABS 222 and yoke tip 227 to the ABS 222 is no more than 1 nm. In other implementations, the difference in distance between edge 239 to the ABS 122 and yoke tip 227 to the ABS 222 is no more than 2 nm.

Figure 3:
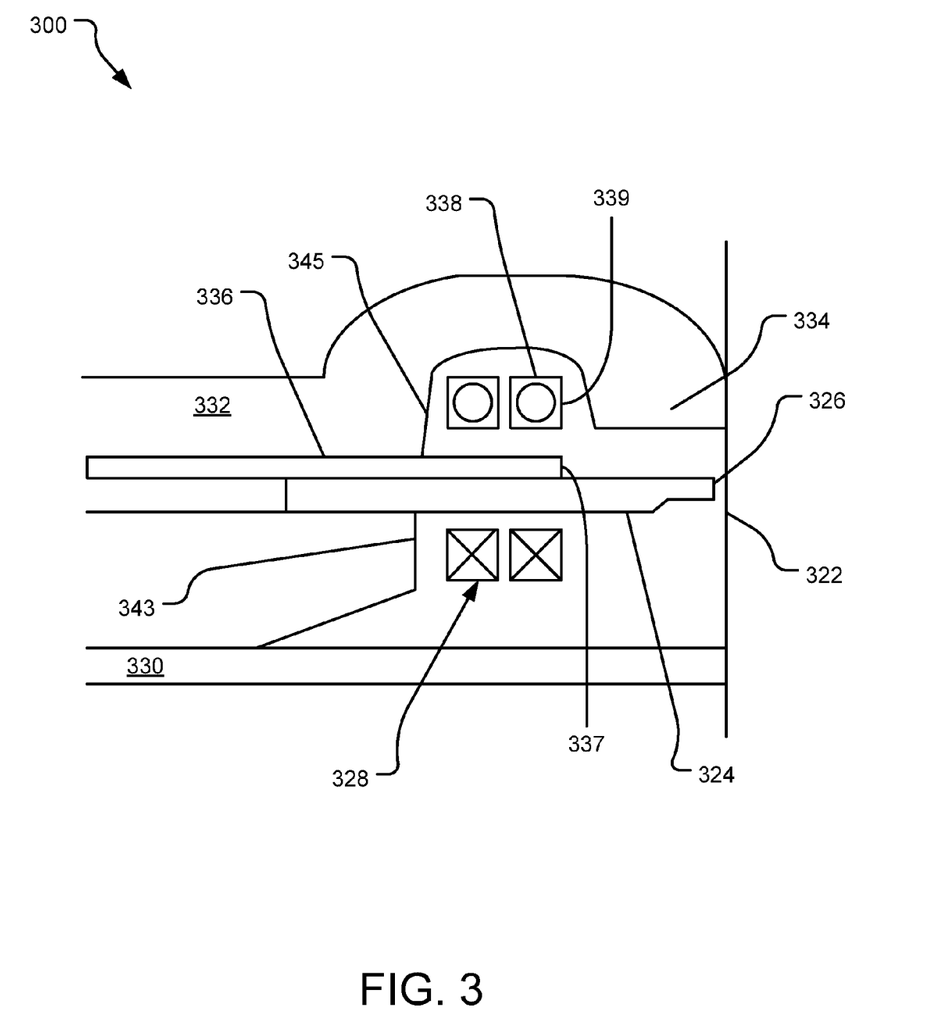
FIG. 3 is a schematic cross-sectional partial side view of another example write head.

FIG. 3 illustrates another implementation of a write head having the first coil turn of the coil structure at least substantially aligned with the yoke tip. Unless indicated otherwise, the elements of FIG. 3 are the same as or similar to like elements of FIG. 2.

In FIG. 3, a write head 300 has an air bearing surface (ABS) 322, a main pole 324 having a pole tip 326 proximate the ABS 222, and a yoke 336 having a yoke tip 337 recessed from pole tip 326. A coil structure 328 is present around main pole 324 and yoke 336 as a plurality of turns 338.

Write head 300 has a first return pole (RP1) 330 and a second return pole (RP2) 332 on the opposite side of pole 324. RP2 332 includes a front shield 334 extending towards main pole 324 at the ABS 322. A first back via 343 connects main pole 324 to RP1 330 by way of yoke 336 and a second back via 345 connects main pole 324 to RP2 332.

Coil structure 328 wraps between main pole 324 and RP1 330 and between main pole 324/yoke 336 and RP2 332. In this implementation, coil structure 328 has two turns 338 on each side of main pole 324 and yoke 336. Each turn 338 of coil structure 328 is connected in series with the other turns 338 of coil structure 328, however, any suitable configuration of coil structure 328 can be utilized. In one implementation, a dielectric or insulating material (not shown), such as alumina (Al$_2$O$_3$), electrically insulates coil structure 328 from main pole 324 and RP1 330 and from main pole 324 and RP2 332.

An edge 339 of the first turn 338 of coil structure 328 (i.e., the turn closest to the ABS 322) is at least substantially aligned with yoke tip 337.

Figure 4:
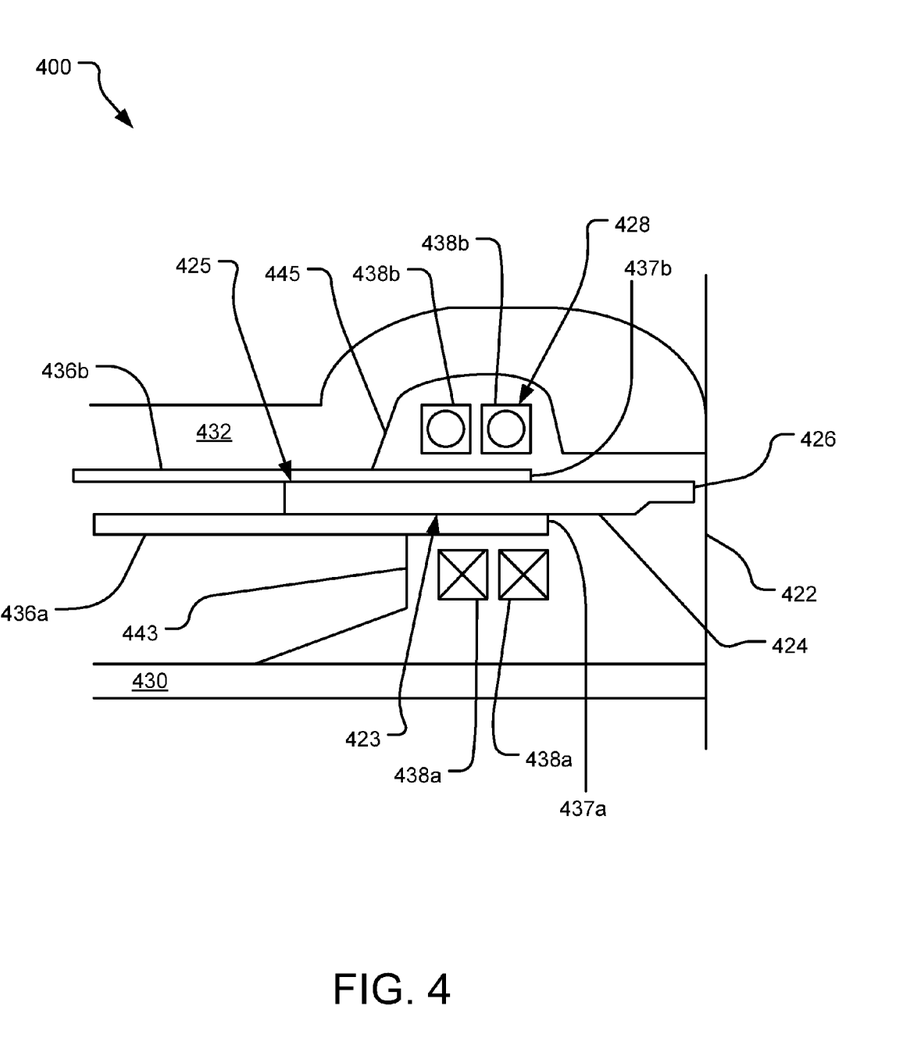
FIG. 4 is a schematic cross-sectional partial side view of yet another example write head.

FIG. 4 illustrates another implementation of a write head having the first coil turn of the coil structure at least substantially aligned with the yoke tip. Unless indicated otherwise, the elements of FIG. 4 are the same as or similar to like elements of FIG. 2 and FIG. 3, whether called out or not.

In FIG. 4, a write head 400 has an air bearing surface (ABS) 422 and a main pole 424 defining a leading edge side 423 and a trailing edge side 425. Main pole 424 has a pole tip 426 proximate the ABS 422. On leading edge side 423 of main pole 424 is a leading yoke 436a having a yoke tip 437a recessed from pole tip 426, and on trailing edge side 425 is a trailing yoke 436b having a yoke tip 437b recessed from pole tip 426. Leading yoke 436a may alternately or additionally be referred to as a "bottom yoke" and trailing yoke 426b may alternately or additionally be referred to as a "top yoke." In the illustrated implementation, yoke tip 437a on leading side edge 423 is not even or aligned with yoke tip 437b on trailing side edge 425.

A coil structure 428 is present around main pole 424 and yokes 436 as a plurality of turns 438. Turns 438a are located on leading edge side 423 proximate yoke 436a and turns 438b are located on trailing edge side 425 proximate yoke 436b.

Write head 400 has a first return pole (RP1) 430 (that includes a front shield, not called out) and a second return pole (RP2) 432 on the opposite side of pole 424. A first back via 443 connects main pole 424 to RP1 430 by way of yoke 436a and a second back via 445 connects main pole 424 to RP2 432 by way of yoke 436b.

Coil structure 428, in this implementation, has two turns 438 on each side of main pole 424 and yokes 436, although in a skewed or offset manner. The first turn 438a is at least substantially aligned with yoke tip 437a on leading edge side 423, and the first turn 438b is at least substantially aligned with yoke tip 437b on the trailing edge side 425, but the first turn 438b is recessed farther away from the ABS 422, because as indicated above, yoke tips 437 are not aligned with each other. In this implementation, coil structure 428 is at least substantially aligned with yoke tip 437a on leading edge side 423 and with yoke tip 437b on trailing edge side 425.

Figure 5:
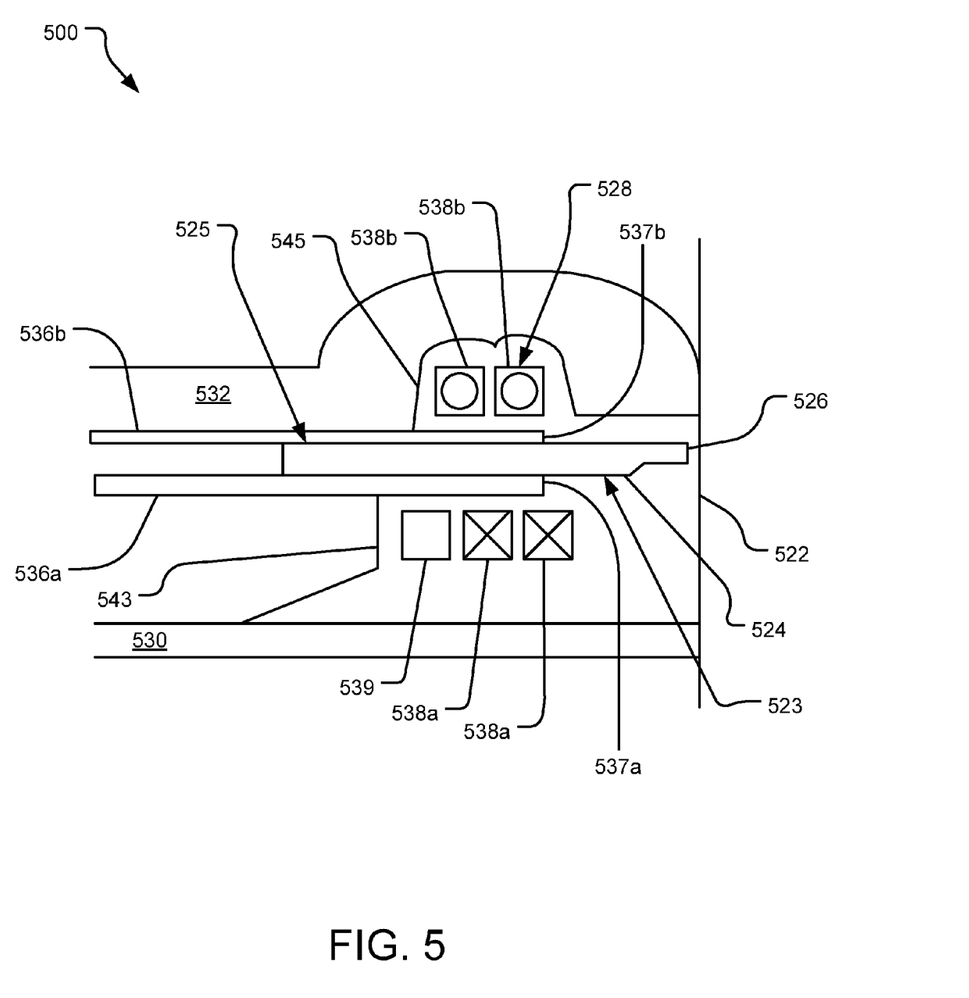
FIG. 5 is a schematic cross-sectional partial side view of yet another example write head.

FIG. 5 illustrates another implementation of a write head having the first coil turn of the coil structure at least substantially aligned with the yoke tip. Unless indicated otherwise, the elements of FIG. 5 are the same as or similar to like elements of FIGS. 2 through 4, whether called out or not.

In FIG. 5, a write head 500 has an air bearing surface (ABS) 522 and a main pole 524 defining a leading edge side 523 and a trailing edge side 525. Main pole 524 has a pole tip 526 proximate the ABS 522. On leading edge side 523 of main pole 524 is a leading yoke 536a having a yoke tip 537a recessed from pole tip 526, and on trailing edge side 525 is a trailing yoke 536b having a yoke tip 537b recessed from pole tip 526. In the illustrated implementation, yoke tip 537a on leading side edge 523 is even with, or aligned with, yoke tip 537b on trailing side edge 525; in other implementations, tips 537 may be not aligned.

A coil structure 528 is present around main pole 524 and yokes 536 with a plurality of active turns 538. Turns 538a are located on leading edge side 523 proximate yoke 536a and turns 538b are located on trailing edge side 525 proximate yoke 536b. Also located on leading edge side 523 is a dummy turn 539, which does not conduct current and thus does not create a magnetic field as do active turns 538. Dummy turn 539 may be physically connected to active turns 538 or may be physically separated from all active turns 538.

To reduce potential flux leakage from coil structure 528 to leading back via 543 and other bulky magnetic materials far away from the ABS 522, the distance between the last active turn 538 and back via 543 is increased. Although the area between active turn 538 and back via 543 could be filled with the dielectric or insulating material (e.g., alumina) surrounding coil structure 528, dummy turn 539 is provided to fill the area with, for example, a less expensive material. In some implementations, dummy turn 539 is provided to facilitate forming (e.g., by plating, deposition, etc.) of write head 500 and its various elements.

Write head 500 has a first return pole (RP1) 530 (that includes a front shield, not called out) and a second return pole (RP2) 532 on the opposite side of pole 524. A first back via 543 connects main pole 524 to RP1 530 by way of yoke 536a and a second back via 545 connects main pole 524 to RP2 532 by way of yoke 536b.

Coil structure 528, in this implementation, has at least two turns around main pole 524 and yokes 536, although in a skewed or unaligned manner. As indicated above, yoke tips 537 are aligned with each other. The first turn 538b on trailing side edge 525 is at least substantially aligned with yoke tip 537b, but the first turn 538a on leading edge side 523 does not at least substantially align with yoke tip 537a, but rather is closer to the ABS 522 than yoke tip 537a. In this implementation, coil structure 528 is at least substantially aligned only with yoke tip 537b on trailing side edge 525.

Figure 6:
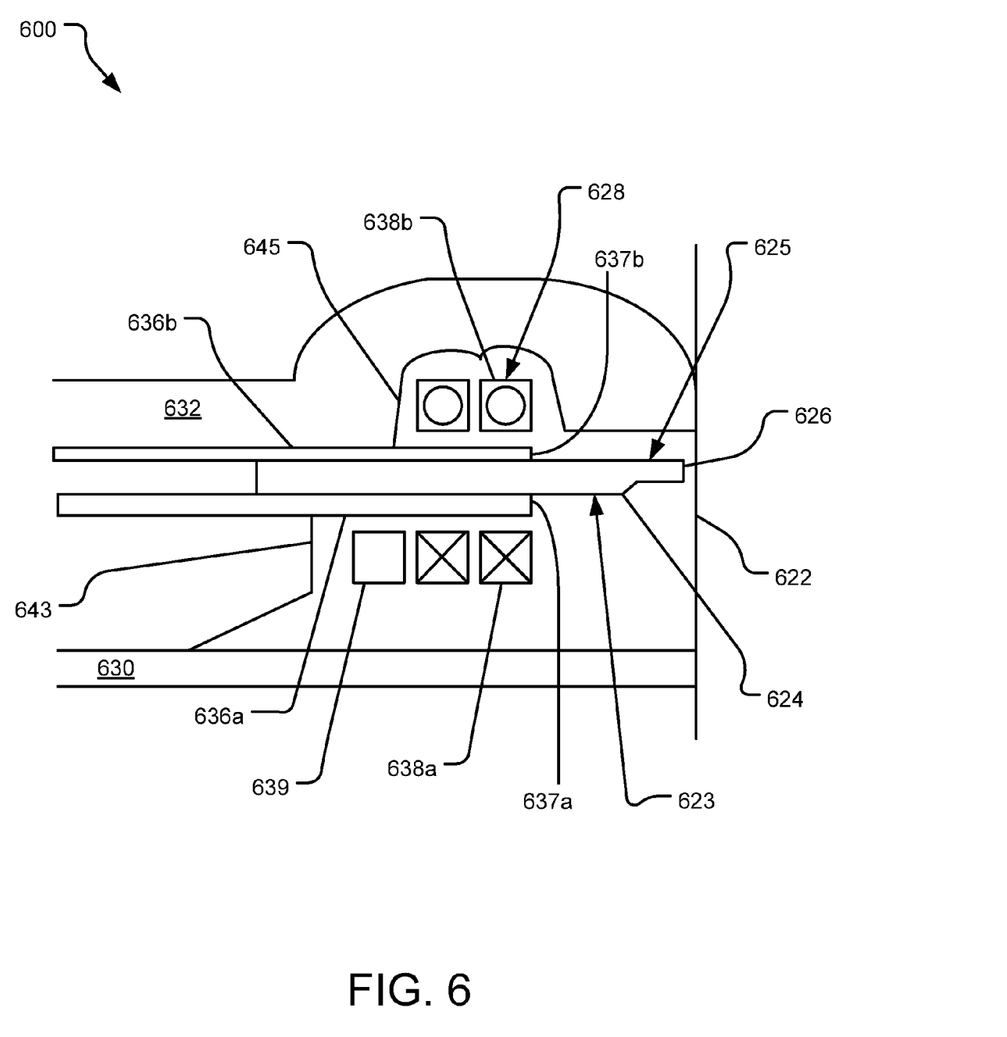
FIG. 6 is a schematic cross-sectional partial side view of yet another example write head.

FIG. 6 illustrates another implementation of a write head having the first coil turn of the coil structure at least substantially aligned with the yoke tip. Unless indicated otherwise, the elements of FIG. 6 are the same as or similar to like elements of FIGS. 2 through 5, whether called out or not.

In FIG. 6, a write head 600 has an air bearing surface (ABS) 622 and a main pole 624 defining a leading edge side 623 and a trailing edge side 625. Main pole 624 has a pole tip 626 proximate the ABS 622. On leading edge side 623 of main pole 624 is a leading yoke 636a having a yoke tip 637a recessed from pole tip 626, and on trailing edge side 625 is a trailing yoke 636b having a yoke tip 637b recessed from pole tip 626. In the illustrated implementation, yoke tip 637a on leading side edge 623 is even with, or aligned with, yoke tip 637b on trailing side edge 625; in other implementations, tips 637 may be not aligned.

A coil structure 628 is present around main pole 624 and yokes 636 with a plurality of active turns 638. Turns 638a are located on leading edge side 623 proximate yoke 636a and turns 638b are located on trailing edge side 625 proximate yoke 636b. Also located on leading edge side 623 is a non-magnetic dummy turn 639.

Write head 600 has a first return pole (RP1) 630 (that includes a front shield, not called out) and a second return pole (RP2) 632 on the opposite side of pole 624. A first back via 643 connects main pole 624 to RP1 630 by way of yoke 636a and a second back via 645 connects main pole 624 to RP2 632 by way of yoke 636b.

Coil structure 628, in this implementation, has at least two turns around main pole 624 and yokes 636. As indicated above, yoke tips 637 are aligned with each other, and both first turns 638a, 638b are at least substantially aligned with their respective yoke tip 637a, 637b.

Figure 7:
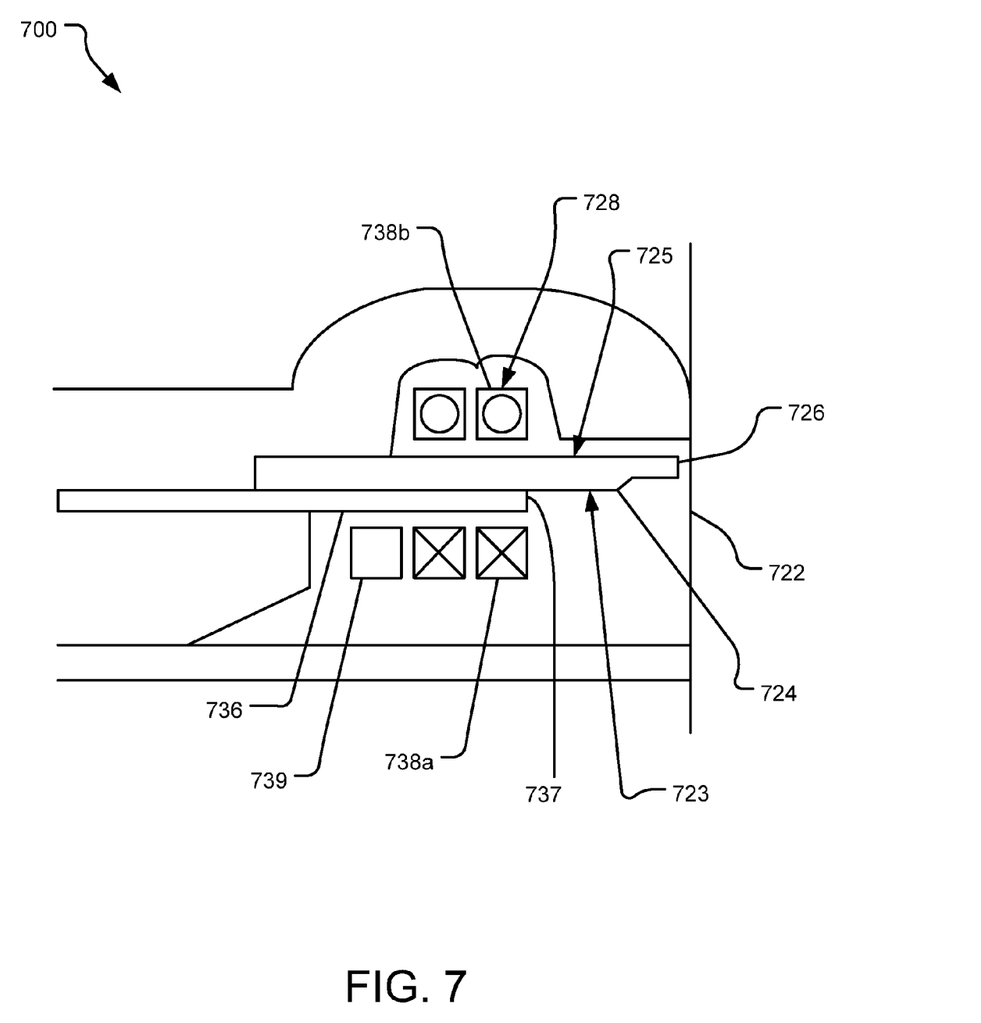
FIG. 7 is a schematic cross-sectional partial side view of yet another example write head.

FIG. 7 illustrates yet another implementation of a write head having the first coil turn of the coil structure at least substantially aligned with the yoke tip. Unless indicated otherwise, the elements of FIG. 7 are the same as or similar to like elements of FIGS. 2 through 6, whether called out or not.

In FIG. 7, a write head 700 has an air bearing surface (ABS) 722 and a main pole 724 with a pole tip 726 and defining a leading edge side 723 and a trailing edge side 725. On leading edge side 723 is a yoke 736 having a yoke tip 737 recessed from pole tip 726.

A coil structure 728 is present around main pole 724 and yoke 736 with a plurality of active turns 738. Turns 738a are located on leading edge side 723 proximate yoke 736 and turns 738b are located on trailing edge side 725. Also located on leading edge side 723 is an optional non-magnetic dummy turn 739. Coil structure 728, in this implementation, has at least two turns around main pole 724 and yoke 736. The first turn 738 on leading edge side 723 is at least substantially aligned with yoke tip 737.

All of the write heads described above, write heads 200, 300, 400, 500, 600, 700, and variations thereof can be fabricated by various methods, including plating, deposition, etching, milling, and other processing techniques.

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top," "upper", "beneath", "below", "above", "on top", etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. An apparatus comprising a write head having an air-bearing surface (ABS) and a rotating storage medium, the write head comprising:
   a main pole having a leading side and a trailing side engaging the medium after the leading side has engaged the medium, the main pole having a portion thereof closest to the ABS defining a pole tip;
   a trailing yoke having a portion thereof closest to the ABS defining a yoke tip; and
   a coil structure comprising at least two active turns aligned on the trailing side of the main pole and at least two active turns and one dummy turn aligned on the leading side of the main pole and, with the dummy turn more distal from the pole tip than the active turns, with a first turn of the at least two active turns on the trailing side having a cross-sectional diameter and its front edge a distance from the yoke tip that is no more than 20% of the active turn's diameter, and with the trailing yoke between the main pole and the at least two active turns on the trailing side of the main pole.

2. The apparatus of claim 1, with the first turn of the coil structure closer to the ABS than the yoke tip.

3. The apparatus of claim 1, with the yoke tip closer to the ABS than the first turn of the coil structure.

4. The apparatus of claim 1, with the first turn of the coil structure aligned with the yoke tip.

5. The apparatus of claim 1, the coil structure comprising three active turns present on the trailing side of the main pole.

6. The apparatus of claim 1, further comprising a leading yoke on the leading side of the main pole.

7. The apparatus of claim 1, with a distance from the ABS to the yoke tip is between 1 and 2 micrometers.

8. The apparatus of claim 1, having no more than two active turns and the one dummy turn present on the leading side of the main pole.

9. The apparatus of claim 1, having no more than three active turns and the one dummy turn present on the leading side of the main pole.

* * * * *